(No Model.) 2 Sheets—Sheet 1.
O. HUFFMAN.
ROTARY CLOTH MEASURING APPARATUS.
No. 254,874. Patented Mar. 14, 1882.
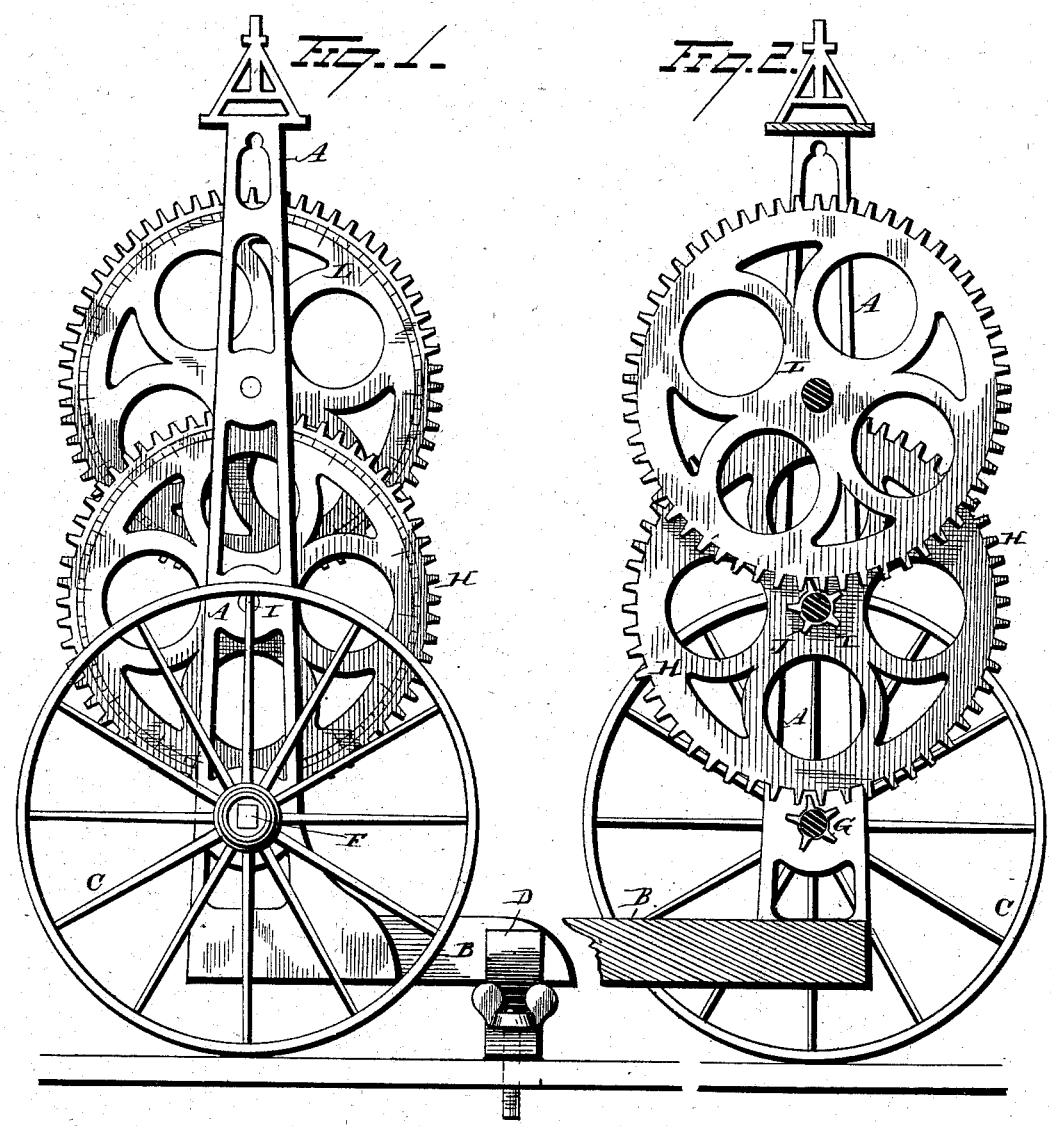
WITNESSES
INVENTOR
Orlando Huffman
By Leggett & Seyzult
ATTORNEY

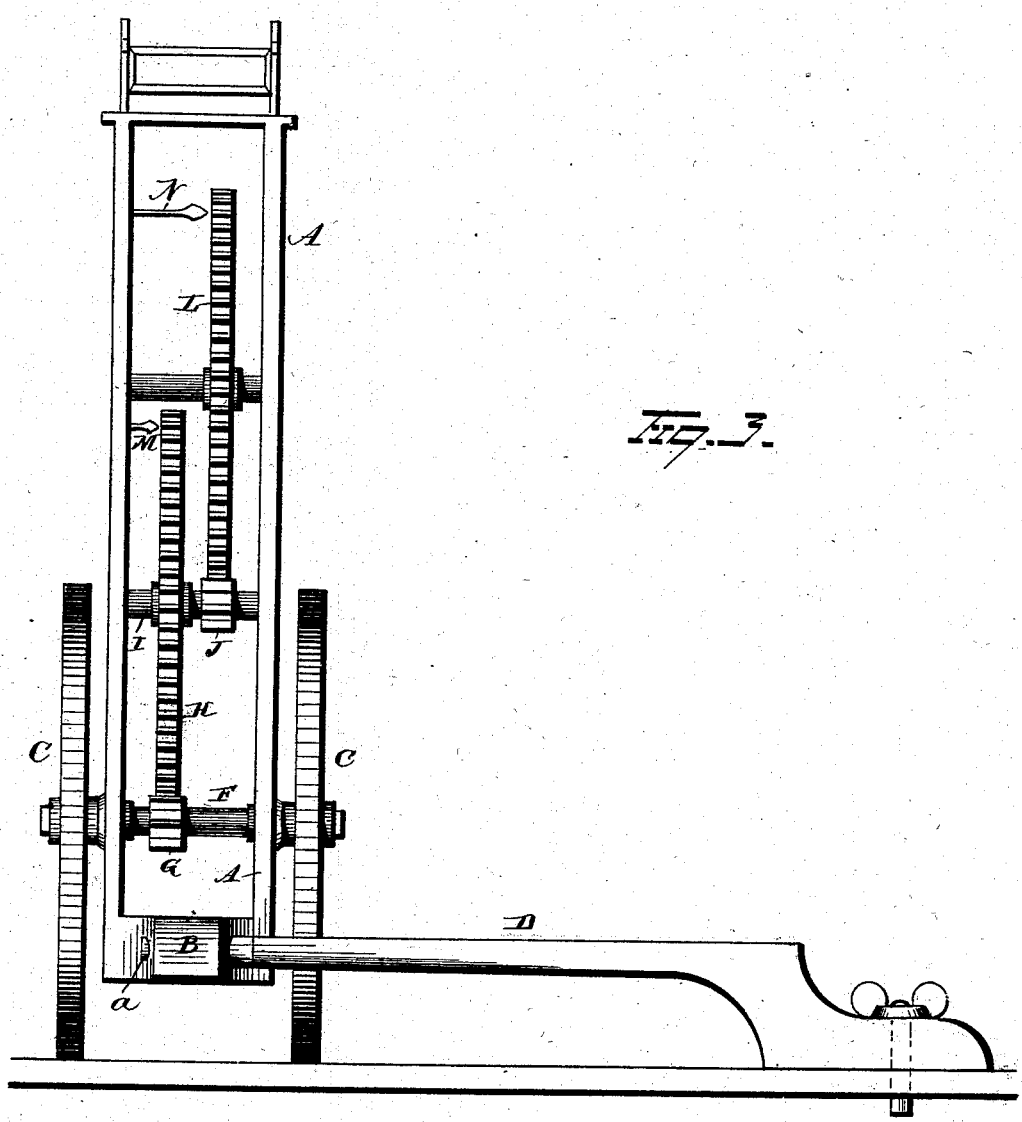

UNITED STATES PATENT OFFICE.

ORLANDO HUFFMAN, OF FRIEND, NEBRASKA, ASSIGNOR OF ONE-HALF TO FREDERICK SANDERSON, OF SAME PLACE.

ROTARY CLOTH-MEASURING APPARATUS.

SPECIFICATION forming part of Letters Patent No. 254,874, dated March 14, 1882.

Application filed December 13, 1881. (No model.)

*To all whom it may concern:*

Be it known that I, ORLANDO HUFFMAN, of Friend, in the county of Salem and State of Nebraska, have invented certain new and useful Improvements in Rotary Measures; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in rotary measures, the object of the same being to provide a cheap, simple, and portable device for accurately measuring dry-goods, carpets, &c., when invoicing; and it consists in certain details in construction and combinations of parts, as will be more fully described, and pointed out in the claims.

In the accompanying drawings, Figure 1 is a side view of my improved device removably secured to a counter. Fig. 2 is a sectional view of the same, and Fig. 3 is an end view.

A represents the rectangular frame which supports the system of registering-wheels, and is provided at its lower end with a projecting tongue, B, which latter extends out sufficiently beyond the bearing-wheels C to allow the retaining-lever D to be secured thereto. This lever D is curved, substantially as shown in the drawings, so that when the latter is secured in position to the counter there will be sufficient space under it for the goods to pass freely without being obstructed or retarded. This lever D can be secured to the counter by thumb-screw or in any suitable manner, and is provided at its inner or free end with a spindle, $a$, which latter is adapted to be introduced into a suitable opening formed in the tongue B, and is held therein by nut or pin secured to the extreme outer end of the spindle $a$, which latter extends through the opening in the tongue sufficiently for that purpose.

By pivoting the frame as above described the machine is adapted to automatically accommodate itself to all thicknesses of goods, measuring all with equal facility and exactness.

In the present machine I have shown two indicating or registering wheels operated by the two bearing-wheels C. These bearing-wheels C are preferably skeleton, instead of solid, and can be corrugated or roughened on their periphery or provided with rubber tires, which will prevent the cloth from slipping under the wheels C without revolving them. The bearing-wheels in this present instance are supposed to measure one-half a yard at each revolution, and are rigidly secured to the projecting ends of the shaft F, outside of the frame. This shaft F is provided with a cog-wheel, G, having five teeth, which latter mesh with the periphery of the first registering-wheel, H, having sixty cog-teeth. The wheel H is rigidly secured inside of the frame A to the shaft I, which latter is also provided with a cog-wheel, J, with five teeth, which register with and operate the second registering wheel, L, having also sixty cog-teeth.

The registering-wheels H and L are each provided with a circumferential graduated scale, while one side of the frame is provided with the two pointers M and N, which point respectively to their scales on the wheels H and L. The scale on wheel H is divided into yards and fractions of yards up to six, and requires twelve revolutions of the bearing or cloth wheels C to revolve it once, while the scale on the wheel L is divided into twelve spaces, representing seventy-two yards, and requires one hundred and forty-four revolutions of the bearing-wheel C to revolve the wheel L once.

When measuring with my improved device it is only necessary to note the relative positions of the pointers M and N to the scales on the wheels H and L and subtract the difference between the numbers at the starting and stopping points; or the wheels can be turned back to the starting-point, so that by looking at the scales and pointers the exact number of yards will be seen at a glance without any calculations whatever.

The different parts of my improved machine may be made of any suitable material and size, and the number of wheels or teeth can be increased or diminished, so as to enable the machine to register a greater or less number of yards at one revolution of the upper wheel, L.

The use of this machine enables a great saving of time, as it enables one man to accomplish in the same time the work of four men.

Another advantage of this machine is that it is exceedingly light in structure, and can be carried from place to place and secured to any counter, and by pivotally securing it thereto, as above described, the whole weight thereof bears directly on the goods being measured, which weight is sufficient to prevent the cloth from being moved under the bearing-wheels C without moving them also.

It is evident that slight changes, both in the construction and relative arrangement of the parts, might be resorted to without departing from the spirit of my invention; and hence I would have it understood that I do not limit myself to the exact construction of parts shown and described, but consider myself at liberty to make such changes as come within the spirit and scope of my invention.

Having fully described my invention, what I claim as new, and desire to secure by Letters Patent, is—

1. In a rotary measuring device, the combination, with the upright frame adapted to support bearing-wheels and a system of graduated wheels, the said frame being provided at its lower end with an outwardly-extending tongue, of a retaining-lever adapted to be removably secured at one end to a counter and afford pivotal bearing for the said tongue at the other end, substantially as set forth.

2. In a rotary measuring device, the combination, with the upright frame adapted to support bearing-wheels and a system of graduated wheels, the said frame being provided at its lower end with an outwardly-extending tongue and with pointers to note the number of yards and fractions of yards passing under the bearing-wheels, of a retaining-lever adapted to be removably secured at one end to a counter and afford pivotal bearing at its opposite end for the said tongue, substantially as set forth.

3. The combination, with the frame A, tongue B, bearing-wheels C, shaft F, cog-wheel G, wheel H, shaft I, cog-wheel J, wheel L, and pointers M and N, the said wheels H and L being provided with graduated circumferential scales, and adapted to operate as described, of the retaining-lever D, adapted to be secured at one end to the counter, and provided with the spindle $a$, adapted to pass through a hole in the tongue B and form a pivotal support for the frame, substantially as set forth.

In testimony that I claim the foregoing I have hereunto set my hand this 5th day of December, 1881.

ORLANDO HUFFMAN.

Witnesses:
   J. W. MOREHOUSE,
   GEO. F. SAWYER.